US012732444B2

(12) United States Patent
Tempel

(10) Patent No.: US 12,732,444 B2
(45) Date of Patent: Sep. 8, 2026

(54) AGENT FUNCTIONALITY EVALUATION IN MANAGED ENDPOINTS

(71) Applicant: Ivanti, Inc., South Jordan, UT (US)

(72) Inventor: Mark Tempel, New Brighton, MN (US)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 18/964,373

(22) Filed: Nov. 30, 2024

(65) Prior Publication Data

US 2025/0184250 A1 Jun. 5, 2025

Related U.S. Application Data

(60) Provisional application No. 63/605,218, filed on Dec. 1, 2023.

(51) Int. Cl.
*G06F 15/173* (2006.01)
*H04L 41/046* (2022.01)
*H04L 43/0817* (2022.01)

(52) U.S. Cl.
CPC ........ *H04L 43/0817* (2013.01); *H04L 41/046* (2013.01)

(58) Field of Classification Search
CPC . H04L 43/0817; H04L 41/046; H04L 41/052; H04L 41/04
USPC ......................................... 709/224, 223, 217
See application file for complete search history.

(56) References Cited

U.S. PATENT DOCUMENTS 8,930,770 B2 * 1/2015 Stanko ................ G06F 11/0709 714/39
9,647,906 B2 5/2017 Asenjo et al.
10,031,815 B2 * 7/2018 Cohen ................. G06F 11/1469
11,416,369 B1 * 8/2022 Trapani ............... G06F 11/3055
11,750,489 B1 9/2023 Agarwa et al.
2023/0401075 A1 * 12/2023 Hall ........................ G06F 9/451

OTHER PUBLICATIONS

International Search Report and Written Opinion for International Application No. PCT/US2024/058002, dated Feb. 28, 2025, 14 pages.
International Search Report and Written Opinion for International Application No. PCT/US2024/058002, dated Jun. 2, 2026, 10 pages.

* cited by examiner

*Primary Examiner* — Kaylee J Huang

(57) ABSTRACT

An embodiment includes a method of health and functionality evaluation of an agent on a managed endpoint. The method includes receiving an agent event message that includes data representing platform health indicators and capacity health indicators. The platform health indicators include quantifications of functionality of communication channels and components that implement the agent. The capacity health indicators include quantifications of functionality of engines that are configured to implement a management operation. The method includes examining the agent event message for a change in status of the health of the agent. Responsive to the agent event message indicating the change, the method includes emitting an updated agent event. The method includes triggering generation a health score for the agent based on the updated agent event and historical agent health data. The method includes communicating to a webhost the health score where it is caused to be displayed.

24 Claims, 8 Drawing Sheets

300

```
[MessageMetadata(Domain = "Afs.AgentLifecycle", Name = "AgentDiagnosticsChanged", Version = "1.0", ObsoleteVersion = false)]
[Description("Sent by AFS to indicate that agent platform diagnostics have changed.")]
public class AgentDiagnosticsChangedEvent : Ievent
    {
    public Guid TenantId { get; set; }
    public string AgentIdentity { get; set;}
    public string FrameworkVersion { get; set;}
    public AgentDiagnostic [] Diagnostics { get; set; }
    }

public class AgentDiagnostic
    {
    public string Name { get; set; }
    public string Value { get; set; }
    }
```

```
[MessageMetadata(Domain = “Afs.AgentLifecycle”, Name = “AgentPolicyRunning”, Version = “2.0”, ObsoleteVersion = false)]
[Description(“Sent by AFS to indicate that a certain policy is reported running by the agent”)]
public class AgentPolicyRunningEvent : Ievent
    {
    public Guid TenantId { get; set; }
    public string AgentIdentity { get; set;}
    public Guid PolicyId { get; set;}
    public int Version { get; set; }
    public CapabilityVersion [] CapabilityVersions { get; set; }
    }

public class CapabilityVersion
    {
    public string Type { get; set; }
    public string Name { get; set; }
    public Guid Id { get; set; }
    public int Version { get; set; }
    }
```

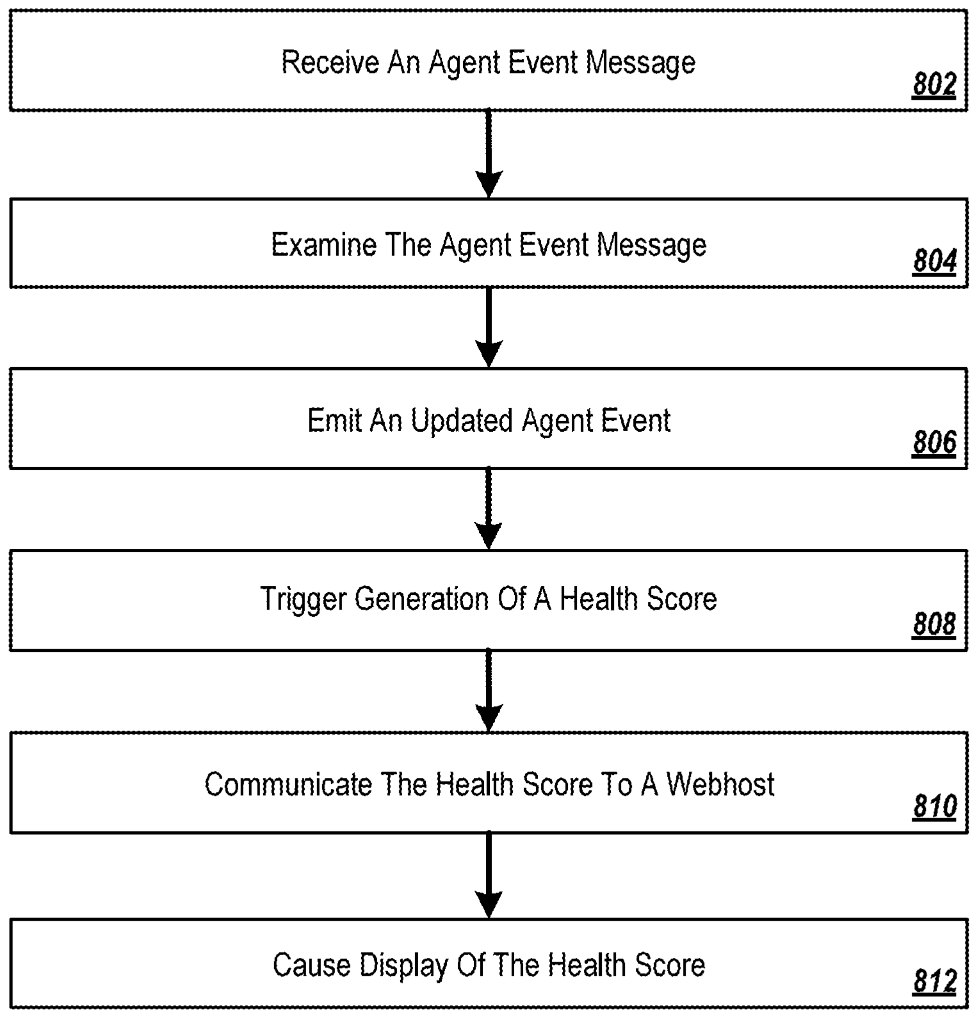
FIG. 8

AGENT FUNCTIONALITY EVALUATION IN MANAGED ENDPOINTS

CROSS-REFERENCE TO RELATED APPLICATION

This application claims priority to and the benefit of U.S. Provisional Application No. 63/605,218, which is incorporated herein by reference in its entirety. Additionally, this application incorporates by reference U.S. Design application Ser. No. 29/919,160, filed Dec. 1, 2023.

FIELD

The embodiments described in this disclosure are related to health and functionality evaluation of an agent implemented on a managed endpoint. In particular, some embodiments are related to systems and methods of evaluation of agents implemented to perform management services on the managed endpoint.

BACKGROUND

Managed networks are implemented to provide management services to endpoints and nodes. For instance, some managed networks may be implemented to control product updates, service management, endpoint discovery, and the like. In some managed networks, communication between a management device and endpoints is conducted using an agent, which is downloaded locally to the endpoints. For example, control signals to perform a management service may be received and implemented by the agent and status information related to the endpoints may be locally assessed and communicated by the agent. The agent may have an elevated level of privilege on the endpoints, which may enable visibility into products and hardware operating on the endpoints. Additionally, the agent may implement or trigger implementation of operations at the endpoints related to the management services.

In cloud-based managed networks and other distributed managed networks, a portion of the nodes and endpoints are outside of the direct control of the management device at least some of the time. For instance, the management device may directly control micro-services and infrastructure within a cloud environment. However, another portion of the network may be operated in a customer environment, which is outside the direct control of the management device. Accordingly, the management device in cloud-based managed networks and the other distributed managed networks rely on the agent and communication with the agent to implement management services.

Additionally, some of the managed networks may include a large numbers of endpoints. For instance, the managed networks may include hundreds or thousands of endpoints. The large number of endpoints may be widely distributed geographically and may have multiple operational patterns. The geographic distribution and some operational patterns may restrict or limit communications between the agents at the endpoints and the management device. Limited communications with the agents may result in infrequent check-ins with the managed device. Accordingly, the operation of the agents may not be known by the managed device. A non-functional agent may restrict or stop implementation of management services at the endpoints. Consequently, inoperable agents may enable the endpoints to be reconfigured by a user, may enable products at the endpoints to become outdated, may enable exposure to vulnerabilities, may enable technical issues to persist, etc.

Thus, there is a need in the field of computing networks to provide comprehensive evaluation of agents at endpoints in managed networks. Additionally, there is a need in the field of computing networks to enable visibility into evaluation results to enable management of the agents and issue troubleshooting to ensure implementation of management services are maintained.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of the invention, an embodiment may include a method of health and functionality evaluation of an agent on a managed endpoint. The method may include receiving, at a service bus, an agent event message. The agent event message may include first data representing platform health indicators and second data representing capacity health indicators. The platform health indicators may include quantifications of functionality of communication channels and components that implement the agent on the managed endpoint. The capacity health indicators may be quantifications of functionality of one or more engines that are configured to implement a management operation at the agent. The agent event message may include data representative of a current status of an agent loaded on a managed endpoint. The method may include examining, by a series of detectors, the agent event message for a change in status of at least one aspect of a health of the agent. Responsive to the agent event message indicating the change, the method may include emitting, by the series of detectors, an updated agent event. The method may include triggering generation a health score for the agent based on the updated agent event and historical agent health data. The method may include communicating to a webhost the health score. The method may include causing display on a web-hosted user interface the health score of the agent.

An additional aspect of an embodiment includes a non-transitory computer-readable medium having encoded therein programming code executable by one or more processors to perform or control performance at least a portion of the method described above.

Yet another aspect of an embodiment includes a computer device. The computer device may include one or more processors and a non-transitory computer-readable medium. The non-transitory computer-readable medium has encoded therein programming code executable by the one or more processors to perform or control performance of one or more of the operations of the methods described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 is an example of an agent diagnostic change event subroutine that may be implemented in the evaluation process of FIG. 2;

FIG. 5 depicts an example agent policy running event subroutine that may be implemented in the evaluation process of FIG. 2;

FIG. 8 is a method of health and functionality evaluation of an agent on a managed endpoint, all according to at least one embodiment described in the present disclosure.

DESCRIPTION OF SOME EXAMPLE EMBODIMENTS

Figure 1:
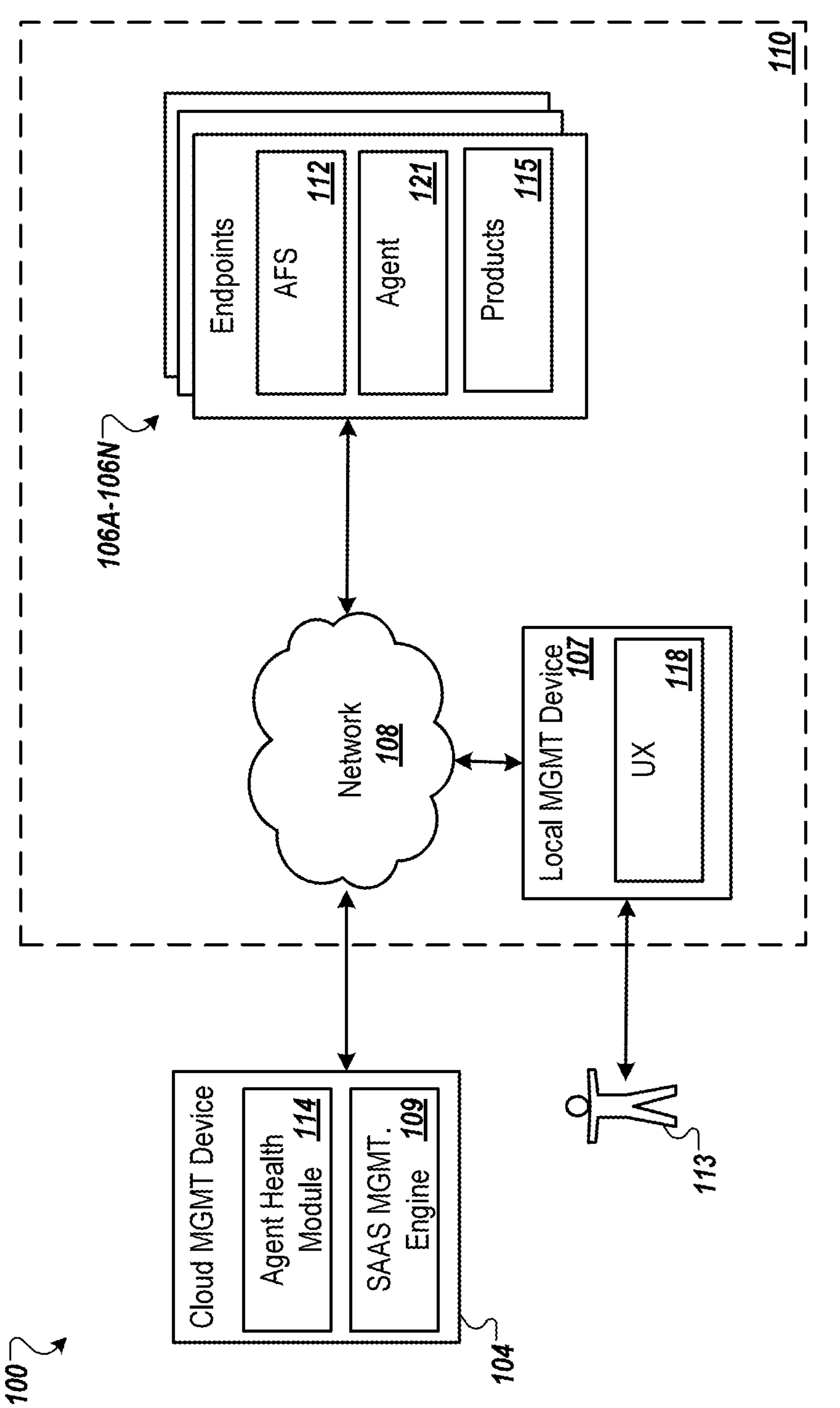
FIG. 1 depicts a block diagram of an example operating environment in which some embodiments described in the present disclosure may be implemented.

The embodiments described in this disclosure are related to agent evaluation in managed networks. In particular, some embodiments are related to systems and methods of comprehensive agent functionality evaluation based on platform indicators and capability indicators. Some embodiments further enable visibility into the evaluation results and technical issue mitigation.

For instance, in some managed networks, agents that are installed at endpoints such as customer devices are used to control and implement management services. Improper function of one or more of the agents may prevent implementation of the management services, which may result in an inability of the endpoints to be managed and controlled. For instance, failure to implement management services may result in vulnerabilities persisting at the endpoints, the endpoints being improperly configured, and telemetry regarding the state of the endpoints being delayed or unavailable to a management device.

Additionally, in some managed networks multiple management services may be implemented that address multiple aspects of the endpoints. For instance, the multiple management services may include update or patch management, service management (e.g., help desk functions), discovery, application management, workspace control, and the like. In these and other managed networks, the agent may include one or more engines. The engines may be configured to implement one or a subset of the management services.

The agents that include multiple engines may be particularly difficult to assess. For instance, functionality of some of the engines may disguise failure of others. Moreover, functionality of a portion of the engines may be regularly used, while others may be used at a less frequent interval. Accordingly, technical issues with some engines may persist longer than technical issues with others.

Furthermore, visibility into functionality of the engines and the overall platform supporting the agent is limited in conventional systems. In these conventional systems, an administrator may become aware of an issue with a particular endpoint. However, a cause of the issue, especially those associated with a malfunctioning agent or engine, may be difficult to troubleshoot or identify. For instance, the administrator may have some telemetry that indicates the particular endpoint is not patched. However, there may be multiple causes of the failure to install product updates.

Some embodiments of the present disclosure provide a comprehensive functionality evaluation. As used in the present disclosure the term "health" is used to refer to describe the performance, operation, and functionality of the agent or components and aspects thereof. For instance, these and other embodiments evaluate the health platform indicators to determine the hardware and communication channels used by the agents are functional. Additionally, some embodiments evaluate the health of one or more or each of the engines at each of the agents. Results of the evaluations enable an administrator to troubleshoot and identify particular aspects of the agent that are malfunctioning. Malfunctioning components may then be mitigated in some embodiments.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 depicts an example operating environment 100 in which some embodiments may be implemented. The operating environment 100 may include a cloud management device 104 communicatively coupled to one or more endpoints 106A-106N (generally, endpoints 106). The cloud management device 104 and the endpoints 106 may be implemented for agent functionality evaluation of agents 121 deployed or installed at the endpoints 106. For instance, in the embodiment of FIG. 1, an agent framework service (AFS) module 112 (in the Figures "AFS") may be implemented at the endpoints 106. The AFS 112 may be configured to collect and relay information regarding the functionality of the agent 121 to an agent health module 114. The agent health module 114 may be configured to evaluate the information regarding the agent 121.

The AFS 112 may be configured to collect information regarding multiple aspects of the agent 121. For instance, the AFS 112 may collect platform-related information and capacity-related information. The platform-related information may relate to hardware, communication channels, etc. that support the agent 121. The capacity-related information may relate to functionality of one or more engines included in the agent 121. The platform-related and the capacity-related information may be normalized and combined to generate an agent score. The agent score may be representative of an overall health or functionality of the agent 121. The agent score and/or other functionality-related information may be made available to a user interface (UX) 118 at a local management device 107. The UX 118 provides visibility to an administrator 113, who can troubleshoot issues and mitigate any issues.

In the embodiment of FIG. 1, the endpoints 106 and the local management device 107 may be implemented in a managed network 110. The cloud management device 104 may provide management services to the endpoints 106 included in the managed network 110. For instance, the cloud management device 104 may include a software as a service (SAAS) management engine 109 (in the Figures "SAAS MGMT engine") that is configured to control and implement the management services.

In the embodiment of FIG. 1, the operating environment 100 may include the endpoints 106, the cloud management device 104, and the local management device 107 that communicate via a network 108. The network 108 is configured to communicate data and information between the endpoints 106, the local management device 107, and the cloud management device 104. These components of the operating environment 100 are introduced in the following paragraphs.

The network 108 may include any communication network configured for communication of signals between the components (e.g., 104, 107, and 106) of the operating environment 100. The network 108 may be wired or wireless. The network 108 may have configurations including a star configuration, a token ring configuration, or another suitable configuration. Furthermore, the network 108 may include a local area network (LAN), a wide area network (WAN) (e.g., the Internet), and/or other interconnected data paths across which multiple devices may communicate. In some embodiments, the network 108 may include a peer-to-peer network. The network 108 may also be coupled to or include portions of a telecommunications network that may enable communication of data in a variety of different communication protocols.

In some embodiments, the network 108 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 108 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

At least a portion of the components of the operating environment 100 may be included in the managed network 110. The managed network 110 is implemented to enable management of the endpoints 106 by the cloud management device 104. To implement the managed network 110, the endpoints 106 may be enrolled. After the endpoints 106 are enrolled, ongoing management of the endpoints 106 may be implemented by the cloud management device 104. The ongoing management may include overseeing and dictating at least a part of the operations at the endpoints 106 as described in the present disclosure. For instance, the ongoing management may include management services such as application control, patch management, service management, and the like.

The endpoints 106 may include hardware-based computer systems that are configured to communicate with the other components of the operating environment 100 via the network 108. The endpoints 106 may include any computer device that may be managed by the cloud management device 104 and/or have been enrolled in a managed network 110. Generally, the endpoints 106 include devices that are operated by the personnel and systems of an enterprise or store data of the enterprise. The endpoints 106 might include workstations of an enterprise, servers, data storage systems, printers, telephones, internet of things (IOT) devices, smart watches, sensors, automobiles, battery charging devices, scanner devices, etc. The endpoints 106 may also include virtual machines, which may include a portion of a single processing unit or one or more portions of multiple processing units, which may be included in multiple machines.

The endpoints 106 include products 115. The products 115 may include applications, components, systems, drivers, of any kind or type. Some examples of the products 115 may include software applications, enterprise software, operating systems, hardware components, installed printers, memory locations, utilized monitors, ports, plug-ins, services, network communication components, the endpoint 106 itself (or information related thereto), similar computer-related features or components, or combinations thereof. The products 115 may differ between the endpoints 106. For instance, the first endpoint 106A might have a processor with different capacity than the processor of the second endpoint 106B.

The endpoints 106 include the agent 121. In some embodiments, the SAAS management engine 109 may interface with the agent 121. For instance, the agent 121 may have an elevated level of privilege on the endpoint 106, which enables visibility of the agent 121 to the products 115 as well as operational parameters related to or characterizing the products 115. The agent 121 may be configured to exist on the endpoints 106 to support ongoing management of the endpoints 106. In some embodiments, the agents 121 may include multiple engines. In these and other embodiments, the engines may each be configured to support one or more of the management services.

The agent 121 may interface with the AFS 112. For instance, the AFS 112 may collect information related to functionality of the agent 121, functionality of engines included therein, functionality of the platform supporting the agent 121, agent stability information, update status related to the products 115, check-in health, other information, or combinations thereof.

In some embodiments, the AFS 112 may collect and temporarily store the information between check-ins by the endpoints 106 with the cloud management device 104. The AFS 112 may then communicate data representative of the information or derivatives thereof to the agent health module 114. For instance, a first endpoint 106A may be operated by a user who works from home or outside of a centralized office. The first endpoint 106A may accordingly check-in with the cloud management device 104 only when the user works in the centralized office. The first endpoint 106A may be in operation between check-ins. During the periods between check-ins the functionality of the agent 121 or the first endpoint 106A may degrade. For instance, one or more of the products 115 may become out of date or may be compromised. Additionally or alternatively, the user may change settings or download a virus on the first endpoint 106A. Additionally, during the periods between check-ins, the AFS 112 may periodically pull information from the agent 121. The AFS 112 may then communicate the information or some derivative thereof to the agent health module 114.

The local management device 107 may include a hardware-based computer system that is configured to communicate with other components of the operating environment 100 via the network 108. The local management device 107 may include a local, administrative device implemented in the managed network 110. For instance, the local management device 107 may be implemented in the managed network 110 to enable managed network level control of the endpoints 106. In some embodiments, the local management device 107 may be a computing device similar to one of the endpoints 106, a single server, a set of servers, a virtual device, or a virtual server in a cloud-based network of servers.

The local management device 107 may be associated with an administrator 113. The administrator 113 may be an individual, a set of individuals, or a system that interfaces with the local management device 107. In some embodiments, the administrator 113 may provide input to the local management device 107 and may view data and information related to the agent 121 in the UX 118. The input provided by the administrator 113 may form the basis of some computing processes and operations performed by the cloud management device 104 and the AFS 112. Some additional details of an example of the UX 118 are provided elsewhere in the present disclosure.

The cloud management device 104 may include a hardware-based computer system that is configured to communicate with other components of the operating environment 100 via the network 108. The cloud management device 104 may include the SAAS management engine 109 and the agent health module 114. The SAAS management engine 116 and the agent health module 114 may be configured to implement remote, cloud-based management and agent evaluation over the endpoints 106 using the agent 121 and the AFS 112. In some embodiments, the cloud management device 104 may be a single server, a set of servers, a virtual device, or a virtual server in a cloud-based network of servers. The agent health module 114 and the SAAS management engine 116 may be spread across multiple servers or cores in a virtual computing environment.

As stated above, the cloud management device 104 operates within the managed network 110 to provide management operations to the endpoints 106. To provide the management operations, the cloud management device 104 includes the SAAS management engine 109 that is configured to perform one or more management operations relative to the endpoints 106. For instance, the SAAS management engine 109 may ensure the endpoints 106 are up to date, may ensure users of the endpoints 106 have access to products and systems 115 (hereinafter, "products 115") suitable for a role or function, the SAAS management engine 109 may provide technical support to the endpoints 106, and the like.

The agent health module 114 may be configured to implement agent functionality evaluation. For instance, the agent health module 114 may be configured to receive agent event messages. The agent event messages may include information communicated from the AFS 112. The agent event message may include data representative of a current status and/or status since a last time the agent 121 checked-in with the cloud management device 104. In some embodiments, the agent event messages may be received or accessed at a service bus. Additionally, in some embodiments, the agent event message may include two or more sets or groups of data. For instance, the agent event messages may include first data and second data. The first data may represent one or more platform health indicators. The second data may represent two or more capacity health indicators. The platform health indicators may include quantifications of functionality of communication channels (e.g., portions of the network 108) and components that implement the agent 121 on one of the endpoints 106. The capacity health indicators may be quantifications of functionality of one or more engines that are configured to implement a management operation at the agent 121.

The agent health module 114 may be configured to examine the agent event message. For instance, the agent health module 114 may examine the agent event message for a change in status of at least one aspect of a health or a function of the agent 121. In some embodiments, the examination or a portion thereof may be performed by one or more detectors. The detectors may be directed to a particular set of functions.

Responsive to the agent event message indicating the change, the agent health module 114 may be configured to emit an updated agent event. The updated agent event may be emitted by one of the series of detectors in some embodiments. Based on the updated agent event, the agent health module 114 may be configured to trigger generation a health score for the agent 121. The health score may be based on the updated agent event and historical agent health data.

The agent health module 114 may be configured to communicate the health score to the local management device 107 and/or a webhost. The agent health module 114 may be configured to cause display of the health score of the agent 121. For instance, the agent health module 114 may cause display of the health score on a web-hosted user interface such as the UX 118.

The SAAS management engine 109, the agent health module 114, the UX 118, the AFS 112, the agent 121, at least some of the products 115, combinations thereof, and components thereof may be implemented using hardware including a processor, a microprocessor (e.g., to perform or control performance of one or more operations), a field-programmable gate array (FPGA), or an application-specific integrated circuit (ASIC). In some other instances, the SAAS management engine 109, the agent health module 114, the UX 118, the AFS 112, the agent 121, at least some of the products 115, combinations thereof, and components thereof may be implemented using a combination of hardware and software. Implementation in software may include rapid activation and deactivation of one or more transistors or transistor elements such as may be included in hardware of a computing system (e.g., the endpoints 106, the local management device 107, or the cloud management device 104 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more managed networks 110, one or more cloud management devices 104, one or more endpoints 106, one or more local management devices 107, or any combination thereof. Moreover, the separation of various components and devices in the embodiments described herein is not meant to indicate that the separation occurs in all embodiments. Moreover, it may be understood with the benefit of this disclosure that the described components and servers may be integrated together into a single component or server or separated into multiple components or servers.

Figure 2:
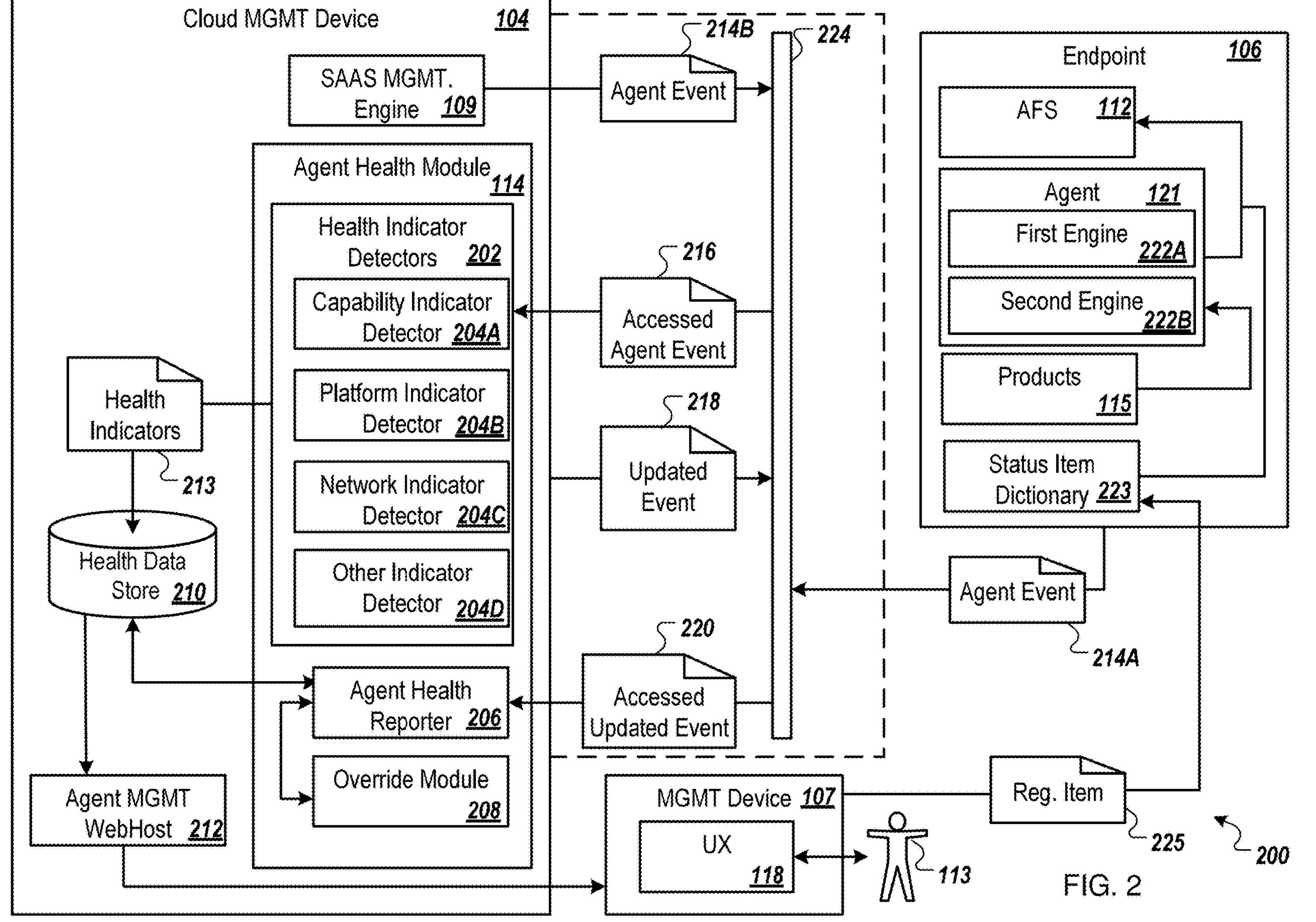
FIG. 2 is a block diagram of an example evaluation process that may be implemented in the operating environment of FIG. 1.

FIG. 2 is a block diagram of an example evaluation process 200 that may be implemented in the operating environment of FIG. 1 or another suitable operating environment. In FIG. 2, some of the components (e.g., 106, 112, 121, 115, 104, 114, 107, and 118) are included that are described with reference to FIG. 1. Although not depicted in FIG. 2, communication of data and information in the evaluation process 200 may be via the network 108 of FIG. 1 or another suitable network.

In FIG. 2, the agent 121 includes a first engine 222A and a second engine 222B (generally, engine 222 or engines 222). Each of the engines 222 may be configured to perform or implement an aspect of a management service. For instance, the first engine 222A may be configured to implement a patch management service and the second engine 222B may be configured to implement a help desk management service. In the embodiment of FIG. 2, two engines are included in the agent 121. In other embodiments, more than two engines 222 may be implemented in the agent 121. In the present disclosure, functionality of the engines 222 is referred to as capacity or capacities. For example, data and information related to the engines 222 is referred to capacity data.

The evaluation process 200 may be implemented in managed networks (e.g., the managed network 110 of FIG. 1) in which the endpoint 106 periodically checks-in with the cloud management device 104. For instance, the endpoint 106 may be operated independently or outside of a LAN. The operation of the endpoint 106 may accordingly be outside the direct control of the cloud management device 104 and the functionality of the agent 121 may degrade. The evaluation process 200 may be implemented to detect, troubleshoot, and correct issues that arise on the agent 121. In some embodiments, communication of information and data derived during the evaluation process 200 may be communicated during a check-in by the endpoint 106. For instance, the endpoint 106 or the cloud management device 104 may periodically establish a communication session with the agent 121. During the communication session, the evaluation process 200 or portions thereof may be implemented.

The evaluation process 200 may be based on agent event messages 214A and/or 214B (in FIG. 2, "agent event") communicated to a bus 224. The bus 224 may be implemented on the cloud management device 104 or otherwise hosted in a managed network. The bus 224 may receive the agent event messages 214 such that data included in the agent event messages 214 may be accessed by the agent health module 114.

The agent event messages 214A and 214B may be communicated by the endpoint 106 or other systems in the operating environment. For instance, a first agent event message 214A may be communicated by the AFS 112 of the endpoint 106 to a bus 224. The first agent event message 214A may be based on information derived from the agent 121 or pulled from plugins associated with one or more of the engines 222. Additionally or alternatively, a second agent event 214B may be communicated to the bus 224 from the SAAS management engine 109. In the present disclosure the agent event messages 214A and 214B may be collectively or generally referred to as agent event messages 214.

The agent event messages 214 may include information related to functionality of the agent 121, a platform supporting the agent 121, one or more of the engines 222, or combinations thereof. The agent event messages 214 may be accessed from the bus 224 and analyzed by one or more health indicator detectors 202. Based on the analysis, an agent health score may be computed by an agent health reporter 206. The agent health score may represent an overall functionality of the agent 121. For instance, in some embodiments, the agent health score may represent a current level of functionality degradation of the agent 121. In these and other embodiments, the agent health score may be represented by a real number such as in a range of 0.0-1.0 or another suitable range. In embodiments in which the agent health score represents the current level of functionality degradation of the agent 121, the lower the value of the agent health score, the lower the health of the agent 121. The agent health score represented by the real number may enable a consistent representation between endpoints and may further enable flexibility in presentation and further analysis.

The agent health score or a derivative thereof may be integrated into an agent health report. The health report may be communicated to the local management device 107 and caused to be displayed on the UX 118 such that the administrator 113 is able to review the health report, initiate measures to mitigate issues at the agent 121, etc. The agent health report may additionally include a collection of indicators and evidence from which the agent health score is derived.

In some embodiments, the health score of the agent 121 may be based on health of a platform supporting the agent 121 and health of the engines 222. In these and other embodiments, the agent event messages 214 may include first data representing one or more platform health indicators and second data representing one or more capacity health indicators. The platform health indicators are quantifications of functionality of communication channels and components that implement the agent 121 on the managed endpoint 106. The capacity health indicators are quantifications of functionality of one or more of the engines 222.

In some embodiments, the first data representing the platform health indicators may be communicated separately from the second data representing the capacity health indicators. For instance, the first agent event message 214A may include data and information related to the capacity health indicators and the second agent event 214B may include data and information related to the platform health indicators. Additionally or alternatively, the first data and the second data may be communicated together. For instance, the first agent event message 214A may include data representing at least some of the platform health indicators and at least some of the capacity health indicators.

The platform health indicators may be based on diagnostic routines implemented on the endpoint 106. The diagnostic routines may generate one of the agent event messages 214 that indicate that one of the platform health indicators has changed. For instance, the agent event messages 214 may indicate a change to one or more of the platform health indicators between check-ins by the endpoint 106. Some examples of the platform health indicators represent an ability of the agent 121 to connect to a distribution server, an ability of the agent 121 to download of a manifest (e.g., a manifest of the products 115), an ability of the agent 121 to download a component (e.g., one of the products 115), a validity of a manifest; an age of a manifest, trust status of one or more of the engines 222, accessibility of one or more of the engines 222, installation status of a component, installation status of a prerequisite, other platform health indicators, or combinations thereof. Failures of platform health indicators may be communicated with error codes that are assigned to key names associated with one of the platform health indicators. For instance, a first error code 1000 may be communicated in the agent event message 214 responsive to a failure to connect to the distribution server named in a value with supplied credentials while a second error code 1010 may be communicated in the agent event message 214 responsive to a failure to download the manifest.

In some embodiments, the platform health indicators may be evaluated and integrated into the agent event message 214 using an agent diagnostic change event subroutine.

In FIG. 3, an example of an agent diagnostic change event subroutine 300 is depicted that may be implemented in the evaluation process 200 of FIG. 2. In the agent diagnostic change event subroutine 300, a first set of commands 302 identify a tenant, the agent (e.g., the agent 121), and a framework. An agent diagnosis command 304 implements a set of diagnoses. A class definition identifies each of the diagnoses run on the agent.

Referring back to FIG. 2, in addition to the platform health indicators described above, additional indicators may be implemented in the evaluation process 200. For instance, the platform health indicators may include a connection stability indicator, an agent check-in indicator, software component update indicator, or some combination thereof.

The connection stability indicator is a quantification of stability of a connection between the agent 121 and the cloud management device 104. The connection stability indicator may enable agents that cannot connect to the cloud management device 104 to be triaged and diagnosed as part of a registration process or in case of an extended network outage. In some embodiments, the connection stability indicator may include a forensic diagnosis of a connection between the agent 121 and the cloud management device 104. In these and other embodiments, responsive to a failure to connect to the agent 121, the forensic diagnosis may be implemented. Results of the forensic diagnosis may be retained at the endpoint 106 until the next check-in by the agent 121 with the cloud management device 104. The forensic diagnosis may include a test of domain name system (DNS) resolution of the cloud management device, a route trace to the cloud management device 104 (which may include a maximum number of hops (e.g., 30) and max time out (e.g., 500 milliseconds)), a ping the cloud management device 104, an adapter configuration, a list of products at the endpoint 106 that are out of date, other connection tests, or combinations thereof. The results of the forensic diagnostic may be included in the agent event message 214.

The agent check-in indicator is a quantification of whether or not the agent 121 has checked-in with the cloud management device 104. The agent check-in indicator is based on a scheduled background task that may be implemented by the AFS 112. The scheduled background task may be configured to examine the agent 121 and other agents deployed on the endpoint 106 and other endpoints (e.g., 106) of a managed network (e.g., the managed network 110). Based on the background task, the agent check-in indicator may include an absent agent communication, which is a periodic notification in one of the agent event messages 214 to the cloud management device 104. To generate the absent agent communication, the background task may identify the agent 121 as an absent agent responsive to the agent 121 failing to check in for a particular period of time. The absent agent communication may include an overdue event, which may be implemented as a "cry-for-help" pattern in some embodiments. The overdue event may include an identifier of a tenant associated with one of the engines 222, an identifier of the agent 121 (that is absent), and a number of days since a most recent check in by the agent 121. The period of time prior to the agent 121 being considered absent may be adjustable. For instance, in some embodiments, the period of time may be ten days, one week, one day, or another suitable period of time. In addition, the scheduled background task may generate a returned event. The returned event may include an identifier of the tenant and the identifier of the agent 121 responsive to a check-in by the absent agent.

Figure 4:
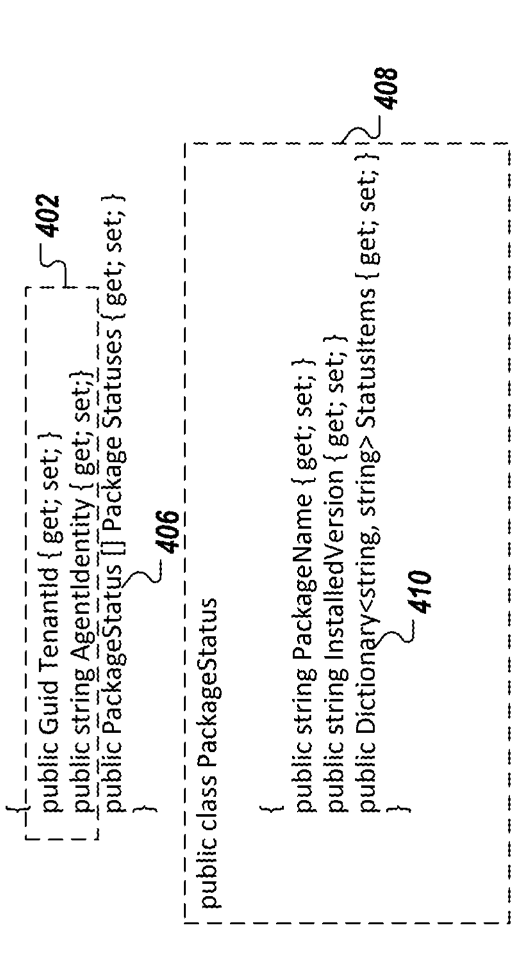
FIG. 4 depicts an example package status change event subroutine that may be implemented in the evaluation process of FIG. 2.

The software component update indicator may include a list of the products 115 at the endpoint 106 that are out of date. The software component update indicator may be based on knowledge of the AFS 112 of the engines 222 installed on the agent 121. FIG. 4 depicts an example package status change event subroutine 400 that may be implemented in the evaluation process 200 to identify versions of the engines 222. Some additional information of the package status change event subroutine 400 is provided elsewhere in the present disclosure. The information related to the versions of the engines 222 may be combined with knowledge of a policy indicating a prescribed version of software components (e.g., the products 115) at the endpoint 106.

FIG. 5 depicts an example agent policy running event subroutine 500 that may be implemented in the evaluation process 200. An output of the agent policy running event subroutine 500 may include prescribed versions that should be implemented on the endpoint 106. In the agent policy running event subroutine 500, a first portion 502 may identify a tenant that included the endpoint 106 and the agent 121. A policy is identified in command 504 and a version of the policy is identified in command 506. A "CapabilityVersion" object 508 identifies a version of one or more of the engines 222. The information included in the "Capability-Version" object 508 is defined in a second portion 510.

Accordingly, the AFS 112 may know the versions of the products 115 and the engines 222 that should be implemented on the endpoint 106 per a policy and the versions of the products 115 and the engines 222 that are currently implemented on the endpoint 106. Thus, the AFS 112 is able to identify the products 115 and the engines 222 that are out of date (e.g., not the current or prescribed version according to the policy).

In some embodiments, the list of products may include two or more manifests that are separated according to distribution rings. For instance, with reference to FIGS. 1 and 2, deployment of product updates or patches may be performed in the managed network 110 in two or more distribution rings. In these and other managed networks, a first distribution ring may include a first subset of the endpoints 106. After the product updates are successfully implemented in the first subset of the endpoints 106, the product updates may be deployed in a second subset of the endpoints 106, etc. In these types of managed networks 110, the software component update indicator may generate manifests based on the distribution rings. For instance, the lists of the products 115 that are up-to-date may further indicate which of the distribution rings one of the endpoints 106 are included. Additionally, the software component update indicator may be part of a ring-based distribution operation.

Referring back to FIG. 2, in some embodiments, the capability health indicators may be pulled from the engines 222 or agent update plugins associated with one or more of the engines 222. The plugins may ask each of the engines 222 for a status statement. Accordingly, the capability health indicators may include a set or multiple status statements-one from each of the one or more engines 222. Weights may be associated with one or more of the status statements. The weights increase or decrease significance of the status statements when aggregating the status statements. For instance, the multiple status statements may include a first status statement and a second status statement. The first status statement may represent a first status of the first engine 222A and the second status statement may represent a second status of the second engine 222B. A first weight is associated with the first status statement and a second weight is associated with the second status. The first and second weights attach a significance to the first and the second status statements such that the first status statement is greater than a significance of the second status statement.

The status statements may include a name-equal-value pair for one or more of the engines 222. For instance, the first status statement may include a first name of the first engine 222A and a first value that is representative of a first status of the first engine 222A. The status statements may be treated as alerts in some embodiments. For instance, the status statements may be present for an issue and absent when there is no issue.

In some embodiments, the name-equal-value pairs may be provided in a status item dictionary 223. The status item dictionary 223 may include a list of the engines 222, key names for the engines 222, and applicable weights that may be associated with the engines 222. In some embodiments, existence of the key names for the engines 222 may be used as an indicator and the value of the name-equal-value may be used as indicator evidence.

The status item dictionary 223 may enable extensibility of the agent 121. For instance, the local management device 107 or another component may communicate a registration event message (in FIG. 2, "Reg. Item") 225 to the status item dictionary 223. The registration event message 225 may specify a list of package names, which may include platforms of the engines 222, the key names, and associated weights. The registration event message 225 updates the list of engines 222 on the endpoint 106.

In some embodiments, when the agent 121 checks in, the agent 121 may collect the status statements from the engines 222. For instance, the agent 121 may ask each of the engines 222 for the status statements using a call implemented by plugins. The agent 121 may then submit the status statements to the AFS 112. The AFS 112 may examine reported status statements from the agent 121. The AFS 112 may then determine whether a current status statement is different from a previous status statement. Responsive to a change in status of one or more of the engines 222, the AFS 112 may emit a package status change event, which may be included in the agent event messages 214. An example of the package status change event subroutine 400 is provided in FIG. 4.

With reference to FIG. 4, the package status change event subroutine 400 includes a first portion 402 that identifies a tenant of the endpoint 106 and the agent 121. The package status change event subroutine 400 includes a "PackageStatus" object for each of the engines 222 on the agent 121. A second portion 408 of the package status change event subroutine 400 provides a definition for the PackageStatus object. The second portion 408 outputs a version of the engine 222, which may be used in the software component update indicator described above. Additionally, the second portion 408 pulls information from the status item dictionary 223, which is referenced by "Dictionary<string, string>" 410.

Referring back to FIG. 2, the agent event messages 214 (including the capacity health indicators and the platform health indicators described above) are communicated to the bus 224. The information and data included in the agent event messages 214 are made available to the agent health module 114. A portion of the agent event messages 214 may be accessed from the bus 224 by the agent health module 114, which is represented in FIG. 2 by "accessed agent event" 216. The agent health module 114 includes the health indicator detectors 202. For instance, in FIG. 2, the health indicator detectors 202 include a capacity indicator detector 204A, a platform indicator detector 204B, a network indicator detector 204C, and other indicator detectors 204D. The health indicator detectors 202 may be configured as a series of detectors that analyze the accessed agent event 216.

The health indicator detectors 202 may be configured to examine the accessed agent event 216 for a change in status of at least one aspect of the health of the agent 121. Responsive to the agent event message indicating the change, the health indicator detectors 202 may emit an updated agent event 218. The updated agent event 218 may be emitted to the bus 224. In addition, the accessed agent event 216 may be processed and health indicators 213 may be submitted to a health data store 210. The health data store 210 may store historical agent health data related to the agent 121. In some embodiments, a particular period the historical agent health data may be stored for a particular period of time. For instance, the historical agent health data may be stored for a period of ninety (90) days. In other embodiments, the historical agent health data may be stored for a period of thirty (30) days, sixty (60) days, or another suitable period of time.

The agent health reporter 206 may access the updated event, which is represented in FIG. 2 by "accessed updated event" 220, from the bus 224. The agent health reporter 206 may compute the health score. To compute the health score, the agent health reporter 206 may weigh the platform health indicators and the capacity health indicators. For instance, in some embodiments, the agent health reporter 206 may equally weigh the platform health indicators and the capacity health indicators. In other embodiments, the platform health indicators may be more heavily weighted or less heavily weighted in computation of the health score. For instance, in some embodiments, the health score may be based on an agent health equation:

$$\text{AgentScore}=1.0-(0.5\times\text{PlatformScore}+0.5\times\text{AggCapacityScore}),$$ in which:

AgentScore represents the health score of the agent 121,

PlatformScore represents a value for the platform health indicators,

AggCapacityScore represents a value for an aggregation of the capacity health indicators.

In the agent health equation, each of the values for the platform health indicators and the aggregation of the capacity health indicators is multiplied by 0.5, indicating that they are equally weighed. As introduced above, the agent score may be a quantification of a level of function degradation in which 0.0 is the worst degradation and 1.0 is the best functionality of the agent 121.

In these and other embodiments, the value for the platform health indicators may be based on a platform health equation:

$$PlatformScore = \min(1.0, \text{sum}(PlatformIndicators)),$$

min (X,Y) represents a function that returns a lower of variables X or Y, sum (X) represents a summation function, and PlatformIndicators represents individual numerical values from each of the platform health indicators.

In the platform health equation, the value for the platform health indicators is in a range of 0.0 to 1.0. If the sum of the platform health indicators is greater than 1, then the platform health equation caps the value at 1.

The value for the capacity health indicators may be based on capacity health indicators equations:

$$\text{for } i = 1 \text{ to } NumCap\text{: } capacityIndicator(i) = \left(\frac{1}{NumCap}\right) * capacityindUnweighted(i) * \text{weight}(i);$$

$$AggCapacityScore = \min(1.0, \text{sum}(capabilityInciators(i))),$$

in which:

NumCap represents a number of capabilities;

capacityIndicator(i) represents a weighted capacity indicator score for a capacity assigned an indicator i;

capacityindUnweighted(i) represents an unweighted capacity score for a capacity assigned an indicator i;

weight(i) represents a weight assigned to a capacity assigned an indicator i; min (X,Y) represents a function that returns a lower of variables X or Y; and sum (X) represents a summation function.

In the capacity health indicators equations, contribution of a value from each of the engines is apportioned. Additionally, the value is multiplied by a weight prior to being apportioned. If the sum of the capacity health indicators is greater than 1, then the capacity health indicators equations cap the value at 1.

The agent health reporter 206 may communicate the computed health score to the health data store 210. The heath score may be integrated into an agent health report at an agent management webhost 212. The agent health report may be made available to the local management device 107 and displayed in the UX 118. An example of the UX 118 is provided in FIG. 6.

In some embodiments, the agent health module 114 may include an override module 208. The override module 208 may enable modifications to the health indicator detectors 202 and/or equations used to compute the health score. In addition, the override module 208 may enable management of information displayed on the UX 118. For instance, during a known degradation, an administrator may limit display of some aspects of the health score.

Figure 6:
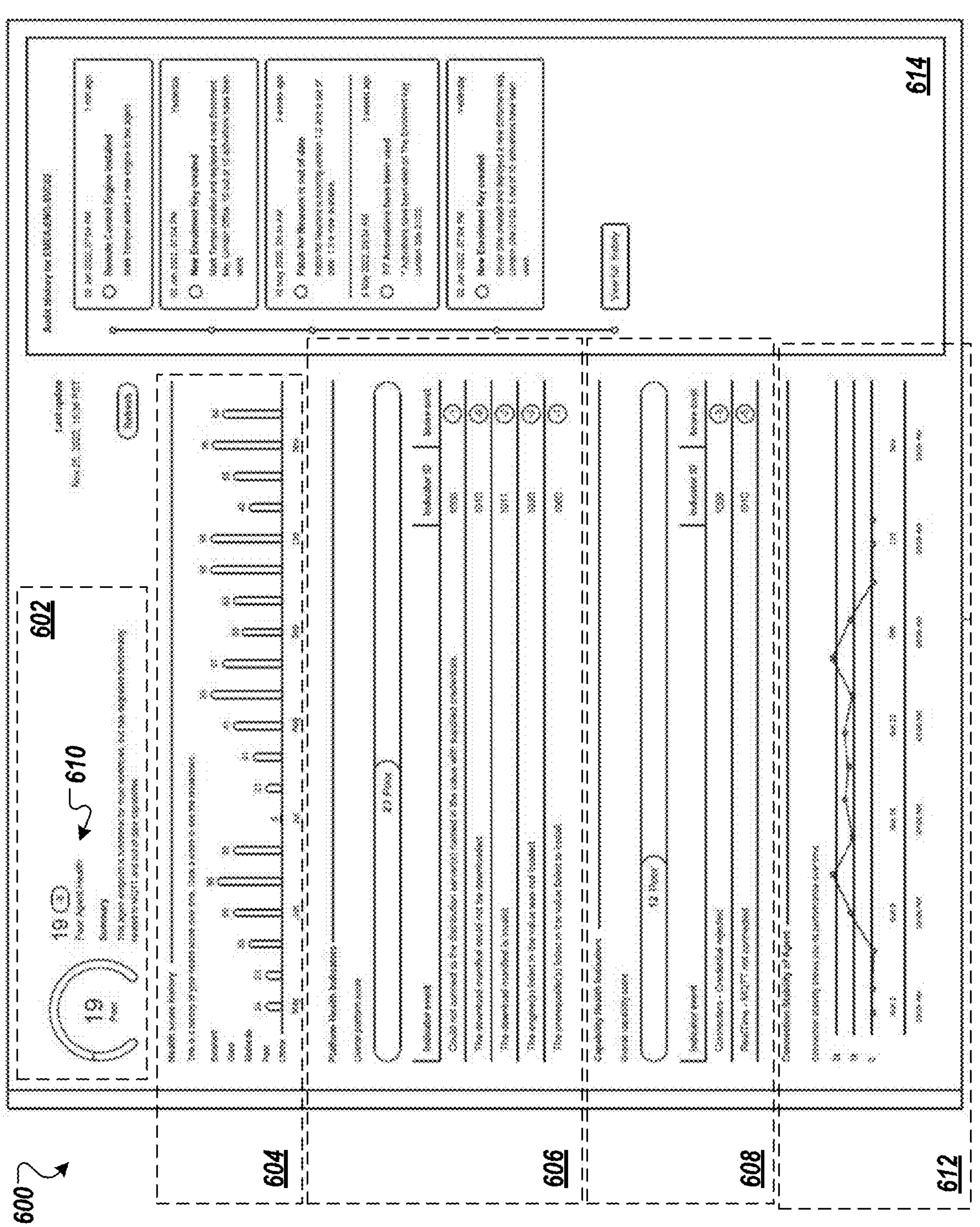
FIG. 6 is an example screenshot of the user interface that may be implemented in the evaluation process of FIG. 2.

FIG. 6 is an example screenshot 600 of the UX 118. The UX 118 includes multiple portions 602, 604, 606, 608, 612, and 614 that display health information related to an agent, referred to as "EMEA-ENG-SVC02", such as the agent 121. In a first portion 602, a health score 610 is displayed. The health score 610 is enumerated as a value between 1 and 100. In FIG. 6, the health score 610 is "19" and a statement "poor agent health" is displayed with a summary.

In a second portion 604, a history of health scores of the agent is displayed. In the second portion 604, dates are displayed along a horizontal axis and heath scores are shown as bars that extend from the horizontal axis. In a third portion 606, health data related to the platform health indicators is displayed. In a top bar of the third portion 606, a platform health score is displayed as a numeric value. In FIG. 6, the platform health score is "23." Additionally, a list of individual platform health indicators and their scores are displayed.

In a fourth portion 608 health data related to the capacity health indicators is displayed. In a top bar of the fourth portion 608, a capacity health score is displayed as a numeric value. In FIG. 6, the capacity health score is "12." Additionally, a list of individual capacity health indicators and their scores are displayed. In a fifth portion 612, connection stability of the agent is displayed. The horizontal axis depicts dates and times. A line plot depicts connection over the time. A sixth portion 614 depicts a list of historical events relevant to the agent.

Figure 7:
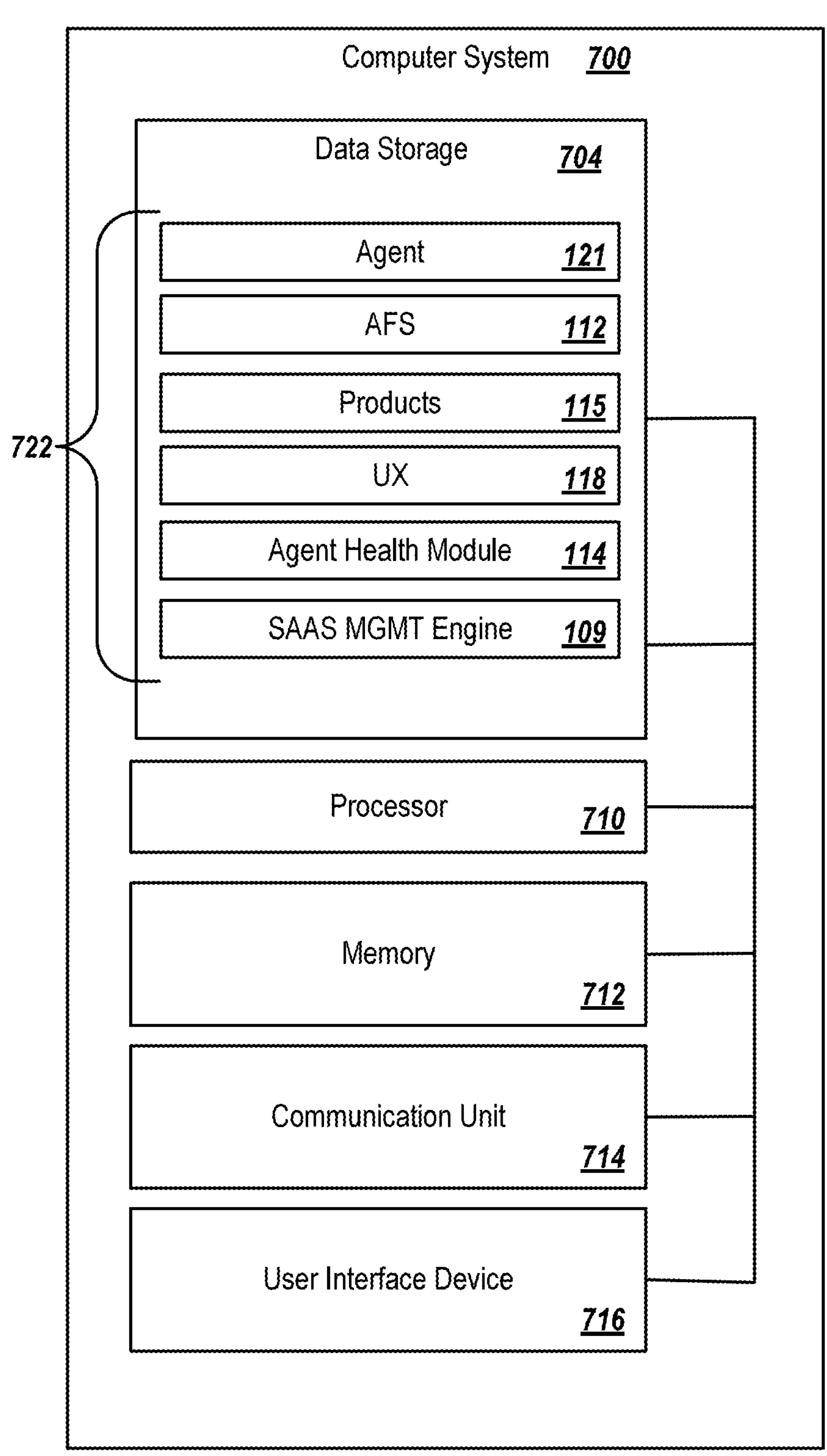
FIG. 7 illustrates an example computer system configured for health and functionality evaluation of an agent.

FIG. 7 illustrates an example computer system 700 configured for agent functionality evaluation in managed endpoints according to at least one embodiment of the present disclosure. The computer system 700 may be implemented in the operating environment 100 of FIG. 1, for instance. Examples of the computer system 700 may include the cloud management device 104, the local management device 107, one of the endpoints 106, or some combination thereof. The computer system 700 may include one or more processors 710, a memory 712, a communication unit 714, a user interface device 716, and a data storage 702 that includes one or more or a combination of the agent 121, the AFS 112, the products 115, the UX 118, the agent health module, the SAAS management engine 109 (collectively, system modules 722).

The processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 7, the processor 710 may more generally include any number of processors configured to perform individually or collectively any number of operations described in the present disclosure. Additionally, one or more of the processors 710 may be present on one or more different electronic devices or computing systems. In some embodiments, the processor 710 may interpret and/or execute program instructions and/or process data stored in the memory 712, the data storage 702, or the memory 712 and the data storage 702. In some embodiments, the processor 710 may fetch program instructions from the data storage 702 and load the program instructions in the memory 712. After the program instructions are loaded into the memory 712, the processor 710 may execute the program instructions.

The memory 712 and the data storage 702 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 714 may include one or more pieces of hardware configured to receive and send communications. In some embodiments, the communication unit 714 may include one or more of an antenna, a wired port, and modulation/demodulation hardware, among other communication hardware devices. In particular, the communication unit 714 may be configured to receive a communication from outside the computer system 700 and to present the communication to the processor 710 or to send a communication from the processor 710 to another device or network.

The user interface device 716 may include one or more pieces of hardware configured to receive input from and/or provide output to a user. In some embodiments, the user interface device 716 may include one or more of a speaker, a microphone, a display, a keyboard, a touch screen, or a holographic projection, among other hardware devices.

The system modules 722 may include program instructions stored in the data storage 702. The processor 710 may be configured to load the system modules 722 into the memory 712 and execute the system modules 722. Alternatively, the processor 710 may execute the system modules 722 line-by-line from the data storage 702 without loading them into the memory 712. When executing the system modules 722, the processor 710 may be configured to perform one or more processes or operations described elsewhere in this disclosure.

Modifications, additions, or omissions may be made to the computer system 700 without departing from the scope of the present disclosure. For example, in some embodiments, the computer system 700 may not include the user interface device 716. In some embodiments, the different components of the computer system 700 may be physically separate and may be communicatively coupled via any suitable mechanism. For example, the data storage 702 may be part of a storage device that is separate from a device, which includes the processor 710, the memory 712, and the communication unit 714, that is communicatively coupled to the storage device. The embodiments described herein may include the use of a special-purpose or general-purpose computer including various computer hardware or software modules.

FIG. 8 is a method 800 of health and functionality evaluation of an agent on a managed endpoint according to at least one embodiment of the present disclosure. The method 800 may begin at block 802 in which an agent event message may be received. In some embodiments, the agent event message may be received at a service bus. The agent event message may be communicated when the agent checks in with a cloud management device. Additionally, in some embodiments, the agent may include one or more update plugins. The update plugins may be installed for one or more or each of the engines at the agent. In these and other embodiments, a first of the update plugins may be associated with a first engine of the agent. The update plugin may communicate the agent event message or some portion thereof of the agent event message related to the first engine. The agent event message may include data representative of a current status of an agent loaded on a managed endpoint. For instance, in some embodiments, the agent event message includes first data and second data. The first day may represent one or more platform health indicators. The second data may represent one or more capacity health indicators. The first data and the second data may be communicated separately in two agent event messages or may be integrated into a single agent event message. The platform health indicators may be quantifications or quantitative values of functionality of communication channels and components that implement the agent on the managed endpoint. For instance, the platform health indicators may represent a quantified value for a connection to a distribution server, an ability to download a manifest, a validity of a manifest, an age of a manifest, an ability to download a component, trust status of one or more engines, accessibility of one or more engines, installation status of a component, installation status of a prerequisite, other component or communication channel functionality, or some combination thereof.

The capacity health indicators may be quantifications or quantitative values of functionality of one or more engines that are configured to implement a management operation at the agent. For instance, the capacity health indicators may include one or more status statements. The status statements may include a name-equal-value pair from each of the one or more engines. For example, the agent may include a first engine and a second engine. In this example, the status statements include a first status statement and a second status statement. The first status statement represents a first status of the first engine and the second status statement represents a second status of the second engine. Additionally, in some embodiments, a first weight may be associated with the first status statement and a second weight may be associated with the second status such that a significance of the first status statement is greater than a significance of the second status statement.

In some embodiments, the name-equal-value pair(s) are provided in a status item dictionary. The status item dictionary may be populated by registration events. In these and other embodiments, the method 800 may include receiving a registration event. The registration event may specify a list of package names and key names. The key names may be associated with weights.

At block 804, the agent event message may be examined. The agent event message may be examined by one or more or a series of detectors. The agent event message may be examined for a change in status of at least one aspect of a health of the agent. For example, in some embodiments, a first indicator of platform health indicators may include a software component update indicator. The software component update indicator may include a list of products at the managed endpoint that are out of date. The software component update indicator may be based on a package status change event combined with a policy indicating a prescribed version of software components at the managed endpoint. Additionally, the list of products may include one or more manifests, which may be published per distribution ring in a managed network.

In another example, a first indicator of platform health indicators may include an agent check-in indicator. The agent check-in indicator is a quantification of whether or not the agent has checked-in with a cloud management device. The agent check-in indicator is based on a scheduled background task implemented on each of multiple managed endpoints in a network. The background task communicates a periodic notification to the cloud management device based on durations between check-ins between agents and the cloud management device. For instance, responsive to a failure of an agent to check-in with the cloud management device for a particular time period, the background task may communicate a notification that the agent is an absent agent. In these and other embodiments, the scheduled background task may generate an overdue event that includes data representative of a tenant associated with the engine, an agent identifier associated with the absent agent, and a number of days since a most recent check in by the absent agent. The scheduled background task may also generate a returned event that contains the tenant and the agent identifier responsive to a check-in by the absent agent. The period of time prior to the absent agent being considered overdue may be adjustable.

In yet another embodiment, a first indicator of a platform health indicators includes a connection stability indicator. The connection stability indicator may be a quantification of stability of a connection between an agent and a cloud management device. In these and other embodiments, the method 800 may further comprise responsive to a failure to connect, generating a forensic diagnosis of the connection between the agent and the cloud management device and retaining the forensic diagnosis at the managed endpoint until a check-in by the agent with the cloud management device. The forensic diagnosis may include a test of domain name system (DNS) resolution of the cloud management device, a route trace to the cloud management device, a ping the cloud management device, an adapter configuration, a list of products at the managed endpoint that are out of date, other tests, or any combination thereof.

At block 806, an updated agent event may be emitted. The updated agent event may be emitted responsive to the agent event message indicating the change. In some embodiments, the updated agent event may be emitted by the detectors.

At block 808, generation of a health score may be triggered. The health score may represent the functionality of the agent based on the updated agent event and historical agent health data. The health score may be triggered based on the updated agent event. In some embodiments, the health score may represent a current level of functionality degradation that is based on an agent platform health and health of engines or capacities delivered on the managed endpoint. For instance, the health score may be generated based on the agent health equation described elsewhere in the current disclosure. The agent health equation may be further derived from the platform health equation and/or the capacity health indicators equations described elsewhere in the present disclosure. At block 810, the health score may be communicated to a webhost. At block 812, display of the health score may be caused. In some embodiments, the display of the health score may be caused on a web-hosted user interface.

Although illustrated as discrete blocks, one or more blocks in FIG. 8 may be divided into additional blocks, combined into fewer blocks, or eliminated, depending on the desired implementation. One or more of the methods described in the present disclosure may be performed in a suitable operating environment such as the operating environment 100. The method 800 may be performed entirely or partially by the endpoint 106, the AFS 112, the agent 121, the agent health module 114, the cloud management device 104, or some combination thereof. In some embodiments, a computing system (e.g., 700 of FIG. 7) may include or may be communicatively coupled to a non-transitory computer-readable medium (e.g., the memory 712 of FIG. 7) having stored thereon programming code or instructions that are executable by one or more processors (such as the processor 710 of FIG. 7) to cause the computing system to perform or to control performance of the method 800. Additionally or alternatively, a computing system (e.g., 700 of FIG. 7) may include the processor 710 described elsewhere in this disclosure that is configured to execute computer instructions to cause another computing systems to perform or control performance of the methods.

FIG. 8 is a method 800 of health and functionality evaluation of an agent on a managed endpoint according to at least one embodiment of the present disclosure. The method 800 may improve evaluation of the health of an agent on an endpoint device in a managed network. The method 800 may be performed in a suitable operating environment such as the operating environment 100 of FIG. 1. One or more operations of the method 800 may be performed by a computing device such as the computer system 700 of FIG. 7, the cloud management device 104, the local management device 107, the endpoints 106, or some combination thereof.

In some embodiments, the computer system 700, the cloud management device 104, the local management device 107, the endpoints 106, or another computing system may include or may be communicatively coupled to a non-transitory computer-readable medium (e.g., the memory 712 of FIG. 7) having stored thereon programming code or instructions that are executable by one or more processors (such as the processor 710 of FIG. 7) to cause a computing system (e.g., computer system 700 of FIG. 7, the cloud management device 104, the local management device 107, the endpoints 106) to perform or control performance of the methods. Additionally or alternatively, the computer system 700 of FIG. 7, the cloud management device 104, the local management device 107, or the endpoints 106 may include the processor 710 described elsewhere in this disclosure that is configured to execute computer instructions to cause a computing systems to perform or control performance of the methods.

The method 800 may begin at block 802 in which an agent event message may be received. In some embodiments, the agent event message may be received at a service bus. The agent event message may be communicated when the agent checks in with a cloud management device. Additionally, in some embodiments, the agent may include one or more update plugins. The update plugins may be installed for one or more or each of the engines at the agent. In these and other embodiments, a first of the update plugins may be associated with a first engine of the agent. The update plugin may communicate the agent event message or some portion thereof of the agent event message related to the first engine.

The agent event message may include data representative of a current status of an agent loaded on a managed endpoint. For instance, in some embodiments, the agent event message includes first data and second data. The first day may represent one or more platform health indicators. The second data may represent one or more capacity health indicators. The first data and the second data may be communicated separately in two agent event messages or may be integrated into a single agent event message. The platform health indicators may be quantifications or quantitative values of functionality of communication channels and components that implement the agent on the managed endpoint. For instance, the platform health indicators may represent a quantified value for a connection to a distribution server, an ability to download a manifest, a validity of a manifest, an age of a manifest, an ability to download a component, trust status of one or more engines, accessibility of one or more engines, installation status of a component, installation status of a prerequisite, other component or communication channel functionality, or some combination thereof.

The capacity health indicators may be quantifications or quantitative values of functionality of one or more engines that are configured to implement a management operation at the agent. For instance, the capacity health indicators may include one or more status statements. The status statements may include a name-equal-value pair from each of the one or more engines. For example, the agent may include a first engine and a second engine. In this example, the status statements include a first status statement and a second status statement. The first status statement represents a first status of the first engine and the second status statement represents a second status of the second engine. Additionally, in some embodiments, a first weight may be associated with the first status statement and a second weight may be associated with the second status such that a significance of the first status statement is greater than a significance of the second status statement.

In some embodiments, the name-equal-value pair(s) are provided in a status item dictionary. The status item dictionary may be populated by registration events. In these and other embodiments, the method 800 may include receiving a registration event. The registration event may specify a list of package names and key names. The key names may be associated with weights.

At block 804, the agent event message may be examined. The agent event message may be examined by one or more or a series of detectors. The agent event message may be examined for a change in status of at least one aspect of a health of the agent. For example, in some embodiments, a first indicator of platform health indicators may include a software component update indicator. The software component update indicator may include a list of products at the managed endpoint that are out of date. The software component update indicator may be based on a package status change event combined with a policy indicating a prescribed version of software components at the managed endpoint. Additionally, the list of products may include one or more manifests, which may be published per distribution ring in a managed network.

In another example, a first indicator of platform health indicators may include an agent check-in indicator. The agent check-in indicator is a quantification of whether or not the agent has checked-in with a cloud management device. The agent check-in indicator is based on a scheduled background task implemented on each of multiple managed endpoints in a network. The background task communicates a periodic notification to the cloud management device based on durations between check-ins between agents and the cloud management device. For instance, responsive to a failure of an agent to check-in with the cloud management device for a particular time period, the background task may communicate a notification that the agent is an absent agent. In these and other embodiments, the scheduled background task may generate an overdue event that includes data representative of a tenant associated with the engine, an agent identifier associated with the absent agent, and a number of days since a most recent check in by the absent agent. The scheduled background task may also generate a returned event that contains the tenant and the agent identifier responsive to a check-in by the absent agent. The period of time prior to the absent agent being considered overdue may be adjustable.

In yet another embodiment, a first indicator of a platform health indicators includes a connection stability indicator. The connection stability indicator may be a quantification of stability of a connection between an agent and a cloud management device. In these and other embodiments, the method 800 may further comprise responsive to a failure to connect, generating a forensic diagnosis of the connection between the agent and the cloud management device and retaining the forensic diagnosis at the managed endpoint until a check-in by the agent with the cloud management device. The forensic diagnosis may include a test of domain name system (DNS) resolution of the cloud management device, a route trace to the cloud management device, a ping the cloud management device, an adapter configuration, a list of products at the managed endpoint that are out of date, other tests, or any combination thereof.

At block 806, an updated agent event may be emitted. The updated agent event may be emitted responsive to the agent event message indicating the change. In some embodiments, the updated agent event may be emitted by the detectors. At block 808, generation of a health score may be triggered. The health score may represent the functionality of the agent based on the updated agent event and historical agent health data. The health score may be triggered based on the updated agent event.

In some embodiments, the health score may represent a current level of functionality degradation that is based on an agent platform health and health of engines or capacities delivered on the managed endpoint. For instance, the health score may be generated based on the agent health equation described elsewhere in the current disclosure. The agent health equation may be further derived from the platform health equation and/or the capacity health indicators equations described elsewhere in the present disclosure. At block 810, the health score may be communicated to a webhost. At block 812, display of the health score may be caused. In some embodiments, the display of the health score may be caused on a web-hosted user interface.

Further, modifications, additions, or omissions may be made to the method 800 without departing from the scope of the present disclosure. For example, the operations of method 800 may be implemented in differing orders. Furthermore, the outlined operations and actions are only provided as examples, and some of the operations and actions may be optional, combined into fewer operations and actions, or expanded into additional operations and actions without detracting from the disclosed embodiments. The designations of different elements in the manner described is meant to help explain concepts described herein and is not limiting. Further, the method 800 may include any number of other elements or may be implemented within other systems or contexts than those described.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of health and functionality evaluation of an agent on a managed endpoint, the method comprising:

receiving, at a service bus, an agent event message, wherein the agent event message includes data representative of a current status of the agent loaded on the managed endpoint, the agent event message is communicated when the agent checks in with a cloud management device, the agent event message includes first data representing platform health indicators and second data representing capacity health indicators, the platform health indicators are quantifications of functionality of communication channels and components that implement the agent on the managed endpoint, the capacity health indicators are quantifications of functionality of engines that are configured to implement a management operation at the agent, and the first data and the second data are communicated separately;

examining, by a series of detectors, the agent event message for a change in status of at least one aspect of health of the agent;

responsive to the agent event message indicating the change, emitting, by the series of detectors, an updated agent event;

triggering generation of a health score of the agent based on the updated agent event and historical agent health data, the health score representing a current level of functionality degradation of the agent that is based on an agent platform health and health of the engines delivered on the managed endpoint;

communicating to a webhost the health score; and causing display on a web-hosted user interface, the health score of the agent.

2. The method of claim 1, wherein the platform health indicators represent one or more or a combination of:

connection to a distribution server;

an ability to download a manifest;

validity of a manifest;

age of a manifest;

ability to download one of the components;

a trust status of one or more of the engines;

accessibility of one or more of the engines;

installation status of one of the components; and installation status of a prerequisite.

3. The method of claim 1, wherein:

the engines include a first engine and a second engine;

the capacity health indicators include a plurality of status statements;

each of the plurality of status statements includes a name-equal-value pair from each of the engines;

the plurality of status statements includes a first status statement and a second status statement;

the first status statement represents a first status of the first engine and the second status statement represents a second status of the second engine; and a first weight is associated with the first status statement and a second weight is associated with the second status statement such that a significance of the first status statement is greater than a significance of the second status statement.

4. The method of claim 3, further comprising receiving a registration event that specifies a list of package names and key names with associated weights, wherein the registration event populates a status item dictionary, wherein the name-equal-value pair is provided in the status item dictionary.

5. The method of claim 1, wherein the capacity health indicators are communicated from an update plugin that is installed in at least one of the engines.

6. The method of claim 1, wherein:

the health score is based on an agent health equation:

$$AgentScore=1.0-(0.5\times PlatformScore+0.5\times AggCapacityScore),$$

in which:

AgentScore represents the health score of the agent,

PlatformScore represents a value for the platform health indicators,

AggCapacityScore represents a value for the capacity health indicators.

7. The method of claim 6, wherein:

the value for the platform health indicators is based on a platform health equation:

$$PlatformScore=\min(1.0,sum(PlatformIndicators)),$$ in which:

min (X,Y) represents a function that returns a lower of variables X or Y, sum (X) represents a summation function, and PlatformIndicators represents individual numerical values from each of the platform health indicators; and the platform health equation is configured such that a platform health score is capped at a value of 1.

8. The method of claim 6, wherein the value for the capacity health indicators is based on capacity health indicators equations:

for i=1 to NumCap:

$$capacityIndicator(i)=\left(\frac{1}{NumCap}\right)*capacityindUnweighted(i)*\text{weight}(i);$$

$$AggCapacityScore=\min(1.0,sum(capabilityInciators(i))),$$ in which:

NumCap represents a number of capabilities;

capacityIndicator(i) represents a weighted capacity indicator score for a capacity assigned an indicator i;

capacityindUnweighted(i) represents an unweighted capacity score for a capacity assigned an indicator i;

weight(i) represents a weight assigned to a capacity assigned an indicator i;

min (X,Y) represents a function that returns a lower of variables X or Y; and sum (X) represents a summation function.

9. The method of claim 1, wherein:
a first indicator of the platform health indicators includes a connection stability indicator; and
the connection stability indicator is a quantification of stability of a connection between the agent and the cloud management device.

10. The method of claim 9, further comprising:
responsive to a failure to connect, generating a forensic diagnosis of the connection between the agent and the cloud management device; and
retaining the forensic diagnosis at the managed endpoint until a check-in by the agent with the cloud management device, wherein the forensic diagnosis includes one or more or a combination of:
a test of domain name system (DNS) resolution of the cloud management device;
a route trace to the cloud management device;
a ping to the cloud management device;
an adapter configuration; and
a list of products at the managed endpoint that are out of date.

11. The method of claim 1, wherein:
a first indicator of the platform health indicators includes an agent check-in indicator;
the agent check-in indicator is a quantification of whether or not the agent has checked-in with the cloud management device; and
the agent check-in indicator is based on a scheduled background task that is configured to examine multiple agents that includes the agent deployed on a plurality of managed endpoints that includes the managed endpoint.

12. The method of claim 1, wherein:
a first indicator of the platform health indicators includes a software component update indicator;
the software component update indicator includes a list of products at the managed endpoint that are out of date;
the software component update indicator is based on a package status change event combined with a policy indicating a prescribed version of software components at the managed endpoint; and
the list of products includes manifests published per distribution ring in a managed network.

13. A non-transitory computer-readable medium having encoded therein programming code executable by one or more processors to perform or control performance of operations of health and functionality evaluation of an agent on a managed endpoint, the operations comprising:
receiving, at a service bus, an agent event message, wherein the agent event message includes data representative of a current status of the agent loaded on the managed endpoint, the agent event message is communicated when the agent checks in with a cloud management device, the agent event message includes first data representing platform health indicators and second data representing capacity health indicators, the platform health indicators are quantifications of functionality of communication channels and components that implement the agent on the managed endpoint, the capacity health indicators are quantifications of functionality of engines that are configured to implement a management operation at the agent, and the first data and the second data are communicated separately;
examining, by a series of detectors, the agent event message for a change in status of at least one aspect of health of the agent;
responsive to the agent event message indicating the change, emitting, by the series of detectors, an updated agent event;
triggering generation of a health score of the agent based on the updated agent event and historical agent health data, the health score representing a current level of functionality degradation of the agent that is based on an agent platform health and health of the engines delivered on the managed endpoint;
communicating to a webhost the health score; and
causing display, on a web-hosted user interface, the health score of the agent.

14. The non-transitory computer-readable medium of claim 13, wherein the platform health indicators represent one or more or a combination of:
connection to a distribution server;
an ability to download a manifest;
validity of a manifest;
age of a manifest;
ability to download one of the components;
a trust status of one or more of the engines;
accessibility of one or more of the engines;
installation status of one of the components; and
installation status of a prerequisite.

15. The non-transitory computer-readable medium of claim 13, wherein:
the engines include a first engine and a second engine;
the capacity health indicators include a plurality of status statements;
each of the plurality of status statements includes a name-equal-value pair from each of the engines;
the plurality of status statements includes a first status statement and a second status statement;
the first status statement represents a first status of the first engine and the second status statement represents a second status of the second engine; and
a first weight is associated with the first status statement and a second weight is associated with the second status statement such that a significance of the first status statement is greater than a significance of the second status statement.

16. The non-transitory computer-readable medium of claim 15, wherein the operations further comprise receiving a registration event that specifies a list of package names and key names with associated weights, wherein the registration event populates a status item dictionary, wherein the name-equal-value pair is provided in the status item dictionary.

17. The non-transitory computer-readable medium of claim 13, wherein the capacity health indicators are communicated from an update plugin that is installed in at least one of the engines.

18. The non-transitory computer-readable medium of claim 13, wherein:
the health score is based on an agent health equation:

$$\text{AgentScore}=1.0-(0.5\times\text{PlatformScore}+0.5\times\text{AggCapacityScore}),$$

in which:
AgentScore represents the health score of the agent,
PlatformScore represents a value for the platform health indicators,
AggCapacityScore represents a value for the capacity health indicators.

19. The non-transitory computer-readable medium of claim 18, wherein:
the value for the platform health indicators is based on a platform health equation:

$$PlatformScore=\min(1.0,sum(PlatformIndicators)),$$ in which:

min (X,Y) represents a function that returns a lower of variables X or Y, sum (X) represents a summation function, and PlatformIndicators represents individual numerical values from each of the platform health indicators; and the platform health equation is configured such that a platform health score is capped at a value of 1.

20. The non-transitory computer-readable medium of claim 18, wherein the value for the capacity health indicators is based on capacity health indicators equations:

for i=1 to NumCap:

$$\text{for } i = 1 \text{ to } NumCap\text{: } capacityIndicator(i) = \left(\frac{1}{NumCap}\right) * capacityindUnweighted(i) * \text{weight}(i);$$

$$AggCapacityScore = \min(1.0, \text{sum}(capabilityInciators(i))),$$

in which:

NumCap represents a number of capabilities;

capacityIndicator(i) represents a weighted capacity indicator score for a capacity assigned an indicator i;

capacityindUnweighted(i) represents an unweighted capacity score for a capacity assigned an indicator i;

weight(i) represents a weight assigned to a capacity assigned an indicator i;

min (X,Y) represents a function that returns a lower of variables X or Y; and sum (X) represents a summation function.

21. The non-transitory computer-readable medium of claim 13, wherein:

a first indicator of the platform health indicators includes a connection stability indicator; and the connection stability indicator is a quantification of stability of a connection between the agent and the cloud management device.

22. The non-transitory computer-readable medium of claim 21, wherein the operations further comprise:

responsive to a failure to connect, generating a forensic diagnosis of the connection between the agent and the cloud management device; and retaining the forensic diagnosis at the managed endpoint until a check-in by the agent with the cloud management device, wherein the forensic diagnosis includes one or more or a combination of:

a test of domain name system (DNS) resolution of the cloud management device;

a route trace to the cloud management device;

a ping to the cloud management device;

an adapter configuration; and a list of products at the managed endpoint that are out of date.

23. The non-transitory computer-readable medium of claim 13, wherein:

a first indicator of the platform health indicators includes an agent check-in indicator;

the agent check-in indicator is a quantification of whether or not the agent has checked-in with the cloud management device; and the agent check-in indicator is based on a scheduled background task that is configured to examine multiple agents that includes the agent deployed on a plurality of managed endpoints that includes the managed endpoint.

24. The non-transitory computer-readable medium of claim 13, wherein:

a first indicator of the platform health indicators includes a software component update indicator;

the software component update indicator includes a list of products at the managed endpoint that are out of date;

the software component update indicator is based on a package status change event combined with a policy indicating a prescribed version of software components at the managed endpoint; and the list of products includes manifests published per distribution ring in a managed network.

* * * * *